United States Patent
Kempf et al.

(10) Patent No.: US 6,193,042 B1
(45) Date of Patent: Feb. 27, 2001

(54) RETAINING RING STRUCTURE IN A ROTARY MECHANISM AND A METHOD OF ASSEMBLY

(75) Inventors: Greg W. Kempf, Plainfield; James Allen Raszkowski, Indianapolis, both of IN (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/439,267

(22) Filed: Nov. 12, 1999

(51) Int. Cl.[7] .................................................. F16D 23/10
(52) U.S. Cl. .................... 192/85 AA; 29/434; 29/450; 192/70.16
(58) Field of Search ....................... 192/85 AA, 70.16; 403/326, 327, 328; 29/434, 450

(56) References Cited

U.S. PATENT DOCUMENTS

| | | | |
|---|---|---|---|
| 3,624,769 | * 11/1971 | Hansen | 192/85 AA |
| 4,148,384 | * 4/1979 | Stinson | 192/85 AA |
| 4,458,797 | * 7/1984 | Hawkins | 192/85 AA X |
| 5,080,522 | * 1/1992 | Shafirkin | 403/326 |
| 5,131,894 | * 7/1992 | Hilker | 403/326 X |
| 5,207,462 | * 5/1993 | Bartholomew | 403/326 X |
| 5,651,288 | * 7/1997 | Meeusen | 192/85 AA X |
| 6,021,879 | * 2/2000 | Pelouch | 192/85 AA X |

* cited by examiner

Primary Examiner—Charles A. Marmor
Assistant Examiner—Saul Rodríuez
(74) Attorney, Agent, or Firm—Laura C. Hargitt

(57) ABSTRACT

A rotating clutch assembly has an apply piston, a backing plate, drivingly connected with a rotatable shaft, and a plurality of friction plates spaced between the piston and the backing plate. The backing plate is limited in axial movement along the shaft by a pair of locating rings. One ring is secured in a groove on the shaft and the other is secured in a groove on the backing plate. The backing plate has a axially extending wall that overlaps the one ring to prevent centrifugal escape from the groove. During assembly, the backing plate and friction plates are urged in an axial direction against the piston to provide sufficient space to install the one locating ring; and then the backing plate is urged in the other axial direction to provide space to install the other locating ring.

2 Claims, 2 Drawing Sheets

RETAINING RING STRUCTURE IN A ROTARY MECHANISM AND A METHOD OF ASSEMBLY

TECHNICAL FIELD

This invention relates to retaining and locating ring structures and more particularly to retaining and locating ring structures in rotary mechanisms for maintaining an external ring in a predetermined relation with a member to be axially retained.

BACKGROUND OF THE INVENTION

In many rotating devices, such as fluid operated clutches, it is often necessary to limit the axial movement of one or more members. Conventionally, a retaining ring has been used for this purpose. In such arrangements, the retaining ring is positioned in a retaining groove in a rotatable shaft. The member, usually a plate, to be retained and limited in axial movement in one direction has a recess portion that overlaps the retaining ring in the assembled condition. However, in some assemblies, the axial movement range, in the unlimited direction, is sufficient to uncover the ring. When this occurs, it is possible for the ring to expand sufficiently, due to centrifugal forces, to escape from the retaining groove in the shaft. If the ring escapes from the groove, the plate is no longer limited in axial movement and the clutch may not function properly.

SUMMARY OF THE INVENTION

It is an object of the present invention to provide an improved retaining ring structure.

In one aspect of the present invention, a first retaining ring is secured in an external groove in a rotatable member and positioned in a recess in a member to be retained to limit the axial movement thereof in one direction and a second retaining member is positioned to cooperate with the first retaining ring to limit the axial movement of the retained member in the other axial direction. In another aspect of the present invention, the retained member has an internal groove in which the second retaining member is positioned. In yet another aspect of the present invention, the second retaining member is a ring having an inner circumference overlapping an outer circumference of the first retaining ring.

In still another aspect of the present invention, the retained member has an inner circumference axially adjacent the second retaining member and radially spaced from the rotatable member to permit sufficient clearance for the installation of the second retaining member after the first retaining ring has been installed. In a further aspect of the present invention, the first retaining ring is an external retaining ring and the second retaining member is an internal retaining ring.

In yet a further aspect of the present invention, the member to be retained is fully assembled on the rotatable member in the one axial direction, the first retaining member is installed in the rotatable member, the retained member is moved in the other axial direction to overlap the first retaining member, and the second retaining member is installed on the retained member.

DESCRIPTION OF AN EXEMPLARY EMBODIMENT

Figure 1:
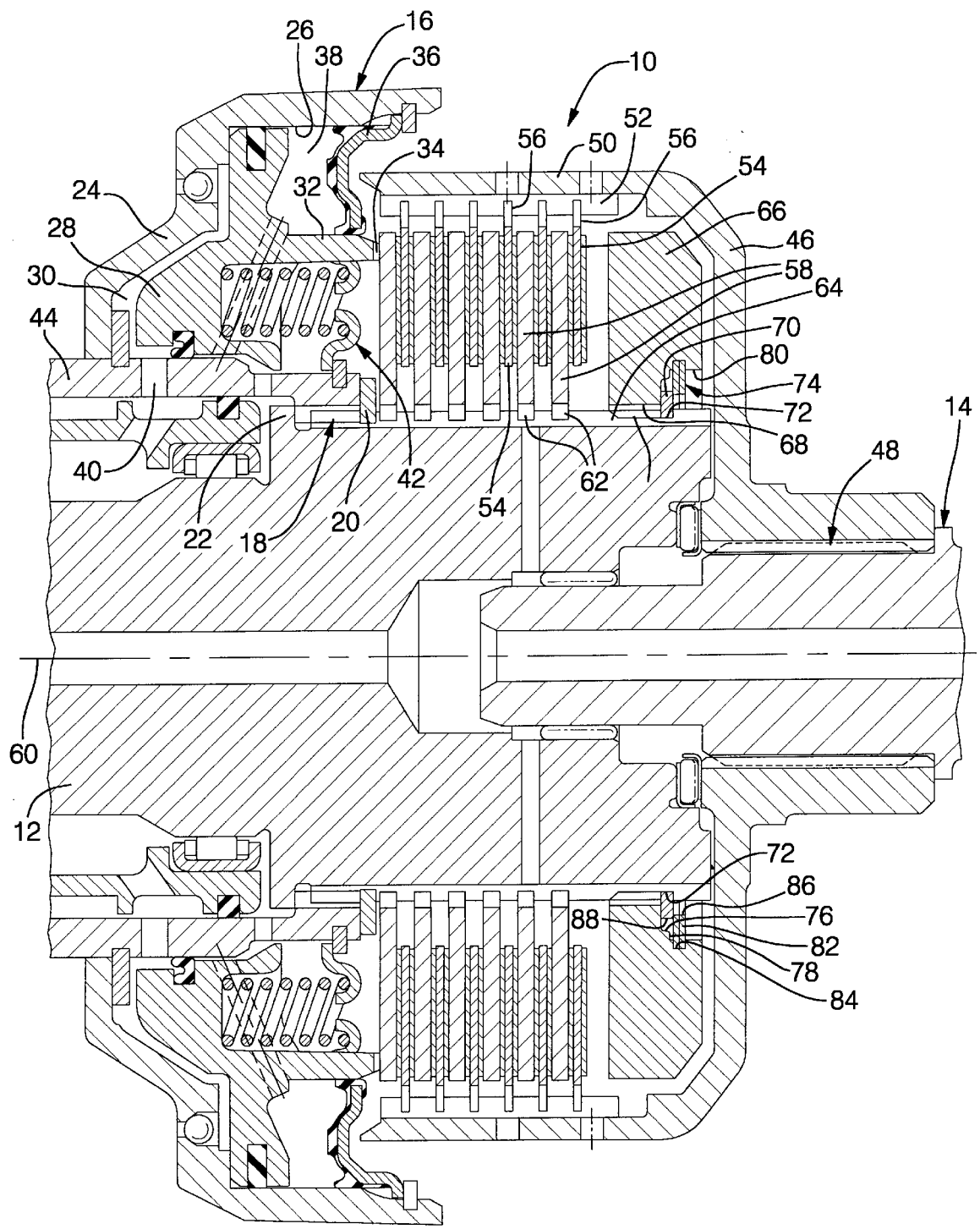
FIG. 1 is a sectional elevational view of a clutch assembly incorporating the present invention.

A selectively engageable fluid operated clutch 10 has an input shaft 12 and an output shaft 14. A clutch input hub or housing 16 is drivingly connected with the input shaft 12 through a spline 18. A locating ring 20 limits rightward movement of the hub 16 on the shaft 12 and a shoulder 22 limits leftward movement of the hub 16 on the shaft 12. The hub 16 has a housing portion 24 in which an annular cavity 26 is formed. An annular piston 28 is slidably disposed on the hub 16 within the cavity 26 and cooperates therewith to form an apply chamber 30.

The piston 28 has an annular extension 32 that has an annular end surface or engagement face 34. The extension 32 has slidably disposed thereon a wall or dam 36 that is secured to the housing 16. The dam 36 cooperates with the cavity 26 to form a balance chamber 38. As is well-known the balance chamber 38, when filled with fluid, will provide a force to balance the centrifugal pressure load on the piston 28. The apply chamber 30 is selectively supplied with fluid in a well-known manner from a conventional hydraulic control assembly, not shown, through a passage 40. A conventional return spring assembly 42 is positioned between the piston 28 and an inner sleeve 44 of the hub 16.

An output hub or housing 46 is drivingly connected with the output shaft 14 through a spline connection 48. The hub 46 has an annular shell portion 50 that has a spline 52 formed therein. A plurality of friction plates or discs 54 are drivingly connected with the spline 52 through a spline 56. A plurality of friction discs or plates 58 are alternated with the plates 54 along the longitudinal axis 60 of the clutch 10. Each plate 58 has a spline 62 that is drivingly connected with a spline 64 formed on the input shaft 12. The friction plates 54 and 58 form a clutch pack. An annular backing plate 66 is also drivingly connected with the input shaft 12 through a spline 68.

The friction plates 54 can move axially along the spline 52 and the friction plates 58 and backing plate 66 can move axially along the spline 64. The friction plates 58 are limited in leftward movement by the piston 28 and in rightward movement by a retaining or locating ring 70 which is secured in a groove 72 formed in the input shaft 12. The backing plate has a recess 74 formed therein. The recess has a first circumferential portion 76, overlapping the ring 70, a radial wall 78 and a second circumferential portion 80. A second retaining or locating ring 82 limits the leftward movement of the backing plate 66.

The locating ring 82 is secured in a groove 84 that is formed in the circumferential portion 80 of the backing plate 66. The ring 82 has an inner periphery 86 that overlaps an outer periphery 88 of the ring 70. The rings 70 and 82 cooperate to maintain the outer periphery 88 to remain, at least partially within the circumferential portion 76. This prevents the ring 70 from expanding, due to centrifugal forces, and escaping from the groove 72. When the clutch 10 is engaged by fluid pressure in the chamber 30, all of the friction plates 58 and 54 are moved to the rightmost position by the piston 28 such that the backing plate limits further rightward movement. When the clutch 10 is disengaged, the return spring assembly 42 urges the piston 28 leftward thereby permitting the friction plates 58 and 54 to assume a free-running clearance alignment. The backing plate, however, is limited in rightward movement by the rings 70 and 82.

Figure 2:
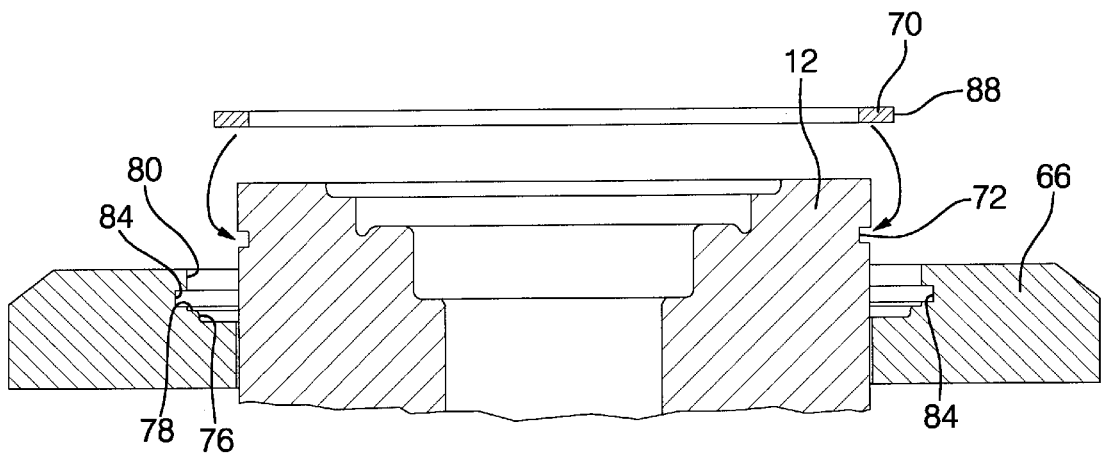
FIG. 2 is a depiction of the position of the components prior to installation of the first retaining member.
Figure 3:
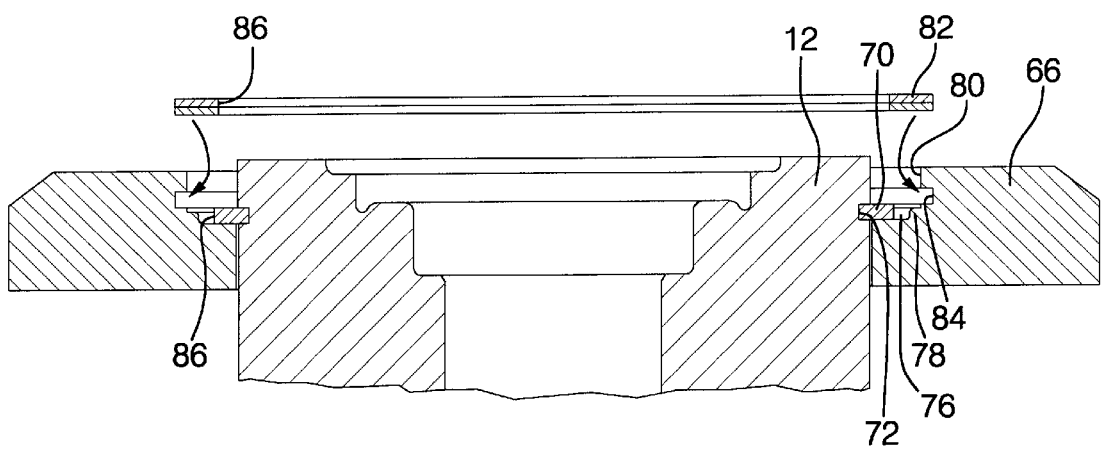
FIG. 3 is a depiction of the position of the components prior to the installation of the second retaining member.

The clutch 10 is assembled on the shaft 12 while the transmission housing, not shown, is in a vertical position as seen in FIG. 2. The hub 16, piston 28, return spring assembly 42, friction plates 58 and 54 are assembled on the shaft 12. The backing plate 66 is installed and by the force of gravity urges the entire assembly downward until the piston 28 bottoms in the housing 16 and the shoulder 22 is abutted by the housing 16. At this point the clutch is fully compressed and the groove 72 is accessible for the installation of the ring 70. After the ring 70 is installed, the backing plate 66 is urged mechanically against the ring 70 thereby exposing the groove 84 to permit the insertion of the ring 82. The backing plate 66 is released and the output hub 46 and the shaft 14 are then installed This completes the assembly of the clutch 10. Alternative methods of urging the backing plate upward during assembly are possible. For example, pneumatic pressure can be presented at the chamber 30 to effectively engage the clutch and thereby urge the backing plate upward. However, the mechanical wedging of the backing plate 66 is deemed to be the least costly and most efficient. After assembly, the clutch has a "free-running" clearance determined by the shoulder 22 and the ring 70. Since the backing plate 66 is limited in axial travel by the rings 70 and 82, the "free-running" clearance is immaterial to the axial positioning of the backing plate 66. This is not true of the prior art clutch assemblies.

What is claimed is:

1. A rotating clutch mechanism comprising:

a rotatable input shaft;

a rotatable piston drivingly connected with said input shaft and defining one axial extent of said clutch mechanism;

a plurality of input friction plates drivingly connected with, axially moveable on, and spaced axially along said input shaft in axial alignment with said piston;

an output member;

a plurality of output friction plates drivingly connected with and axially moveable on said output member, and being alternately spaced with and axially aligned with said input friction plates, said input friction plates and said output plates defining a clutch pack;

a backing plate drivingly connected with said input shaft defining an extent of said clutch pack and being axially aligned with said input friction plates, said backing plate having a recess formed thereon having first and second circumferential walls;

a first retaining and locating ring secured in a groove on said input shaft to limit axial movement in one direction along said shaft; and a second retaining and locating ring secured in a groove in said second circumferential wall and having an inner periphery overlapping an outer periphery of said first retaining ring and cooperating therewith to retain said first retaining ring in overlapping relation with said first circumferential wall and thereby limiting axial movement of said backing plate in another axial direction.

2. A method of assembling a clutch comprising the steps of:

positioning a shaft in a vertical attitude;

installing a piston on said shaft;

installing a clutch pack comprised of alternately spaced input plates and output plates with said input plates being drivingly connected with said shaft;

installing a backing plate on said shaft such that the force of gravity urges the backing plate and the clutch pack in one direction toward said piston;

installing a first retaining ring in a groove on said shaft in alignment with a recess in said backing plate;

urging said backing plate in another direction away from said piston and toward abutment with said first retaining ring; and installing a second retaining ring in said recess in said backing plate with an inner periphery thereof axially aligned with an outer periphery of said first retaining to maintain said first retaining ring overlapped by a circumferential wall in said recess to prevent centrifugal removal thereof.

* * * * *